United States Patent [19]

Nomura

[11] Patent Number: 5,210,644
[45] Date of Patent: * May 11, 1993

[54] CAM MECHANISM OF LENS

[75] Inventor: Hiroshi Nomura, Tokyo, Japan

[73] Assignee: Asahi Kogaku Kogyo Kabushiki Kaisha, Tokyo, Japan

[*] Notice: The portion of the term of this patent subsequent to Aug. 11, 2009 has been disclaimed.

[21] Appl. No.: 616,260

[22] Filed: Nov. 20, 1990

[30] Foreign Application Priority Data

Nov. 20, 1989 [JP] Japan .................. 1-301230

[51] Int. Cl.$^5$ .................. G02B 15/14; G02B 7/02
[52] U.S. Cl. .................. 359/694; 359/699; 359/819
[58] Field of Search .................. 359/699-706, 359/811-830; 354/195.1-195.12, 286 R

[56] References Cited

U.S. PATENT DOCUMENTS

| | | | |
|---|---|---|---|
| 3,655,271 | 4/1972 | Suzuki | 359/706 |
| 3,931,629 | 1/1976 | Himmelsbach | 354/195.1 |
| 4,099,847 | 6/1978 | Ito | 359/705 |
| 4,166,675 | 9/1979 | Kanno | 359/822 |
| 4,272,160 | 6/1981 | Uesugi | 359/825 |
| 4,322,150 | 3/1982 | Kamata et al. | 359/705 |
| 4,380,378 | 4/1983 | Tamura | 359/699 |
| 4,384,767 | 5/1983 | Kawai | 359/823 |
| 4,484,800 | 11/1984 | Tamura | 359/699 |
| 4,544,240 | 10/1985 | Shimzu | 359/702 |
| 4,707,083 | 11/1987 | Iizuka et al. | 359/703 |
| 4,711,528 | 12/1987 | Ando et al. | 359/825 |
| 4,759,618 | 7/1988 | Kamata | 359/703 |
| 4,934,789 | 6/1990 | Lemke | 359/823 |

FOREIGN PATENT DOCUMENTS

| | | |
|---|---|---|
| 62-112109 | 5/1987 | Japan . |
| 62-112110 | 5/1987 | Japan . |
| 1433284 | 4/1976 | United Kingdom . |
| 8807694 | 10/1988 | World Int. Prop. O. . |

Primary Examiner—Bruce Y. Arnold
Assistant Examiner—Thong Ngoyen
Attorney, Agent, or Firm—Sandler, Greenblum & Bernstein

[57] ABSTRACT

A cam mechanism of a lens including a cam groove having a conical side face, formed in an inner peripheral surface of a cam ring, and a cam follower which is provided on a lens holder for holding a lens group and which is fitted in the cam groove, so that the cam follower can be moved in an optical axis direction by the movement of the cam ring, spring members provided on the lens holder to elastically support the cam follower in the radial direction of the cam ring, and mounting members provided on the spring members to engage with the cam follower in the radial direction.

28 Claims, 2 Drawing Sheets

CAM MECHANISM OF LENS

BACKGROUND OF THE INVENTION

1. Field of the Invention

The present invention relates to a cam mechanism for moving, for example, a lens group, such as a focusing lens or a zoom lens, in a photographing lens system.

2. Description of the Related Art

In a zoom lens camera, a cam mechanism having a cam ring which is provided in a lens barrel block of a photographing lens so as to rotate or linearly move in the optical axis direction thereof and a cam follower which is fitted in a cam groove formed in the cam ring and which is secured to a lens holder of a zoom lens group is provided to move the lens group (a variator and a compensator) in accordance with the photographing mode (zooming).

The cam ring is usually provided on its inner peripheral surface with a spiral cam groove. In case of a cam ring made of plastic or the like, having a cam groove integrally formed therewith, the cam groove is shaped as an outwardly widened truncated cone (generally V or trapezoid shape) to provide a draft so as not to produce an undercut portion in the cam groove. The cam follower has a truncated conical front end corresponding to the sectional shape of the cam groove.

In the cam mechanism including the cam groove and the cam follower, the cam follower can not be immovably secured to the lens holder itself in the direction of the cam groove. In practice, to fit the cam follower in the cam groove without play, the cam follower is supported on the lens holder so as to move in the direction of the cam groove, taking into consideration a possible change in shape of the cam follower due to change in temperature and the friction between the cam follower and the cam groove. Furthermore, the cam follower is biased to move into the cam groove by a spring, or the like.

However, in the mechanism mentioned above, there is a possibility that the cam follower largely projects from or comes out of the cam groove due to the spring force of the biasing spring. Accordingly, upon assembly, the lens holder must be carefully attached to the cam ring to prevent the cam follower from coming out of the cam groove, which is troublesome.

To solve this problem, it is also known to integrally form the cam follower with the lens holder and provide a spring force to the portion of the lens holder in which the cam follower is provided.

However, in this solution, it is very difficult to realize an appropriate spring force, and if the spring force is too strong, the cam ring can be easily deformed or broken. Furthermore, even if an appropriate spring force is realized, it is difficult to place the cam follower in the cam groove at an appropriate entrance position.

SUMMARY OF THE INVENTION

The present disclosure relates to subject matter contained in Japanese patent application No. 01-301230 (filed on Nov. 20, 1989) which is expressly incorporated herein by reference in its entirety.

The primary object of the present invention is to provide a cam mechanism of a lens in which the cam follower is engaged and held by a biasing spring at an appropriate spring force so as not to come out of the cam groove, and a zoom lens attached to the lens holder is retained by the biasing spring, thus resulting in an easy assembly and a realization of an automatic assembly.

To achieve the object mentioned above, according to the present invention, there is provided a cam mechanism of a lens comprising a cam mechanism of a lens having a cam groove having a conical side face, formed in an inner peripheral surface of a cam ring, and a cam follower which is provided on a lens holder for holding a lens group and which is fitted in the cam groove, so that the cam follower can be moved in an optical axis direction by the movement of the cam ring, wherein the improvement comprises a spring means provided on the lens holder to elastically support the cam follower in the radial direction of the cam ring, and a mounting means provided on the spring means for engaging with the cam follower in the radial direction.

With this arrangement, since the cam follower is connected to the lens holder through the spring means, it is not necessary to grasp the cam follower upon assembly.

Preferably, the cam follower comprises a plurality of cam follower pins, each having at its rear end an engaging portion. The spring means comprises engaging portions which are engaged by the associated engaging portions of the cam follower pins.

The cam follower pins have at their rear ends neck portions which define the engaging portions thereof. The spring means comprises leaf spring members having slits and holes in which the neck portions of the cam follower pins are held.

According to another aspect of the present invention, the lens holder comprises a cylindrical body for holding the lens group and a lens retainer which is mounted to the lens holding cylindrical body to secure the lens group thereto. The leaf spring members can be integrally formed with the lens retainer at the outer periphery thereof.

Preferably, the provision is made to a lens retainer which is mounted to the lens holder to secure the lens group and which has a spring means for engaging with the rear ends of the cam follower pins which are inserted in the insertion holes to elastically bias the same toward the cam groove.

BRIEF DESCRIPTION OF THE DRAWINGS

The invention will be described below in detail with reference to the accompanying drawings, in which.

DESCRIPTION OF THE PREFERRED EMBODIMENTS

Figure 1:
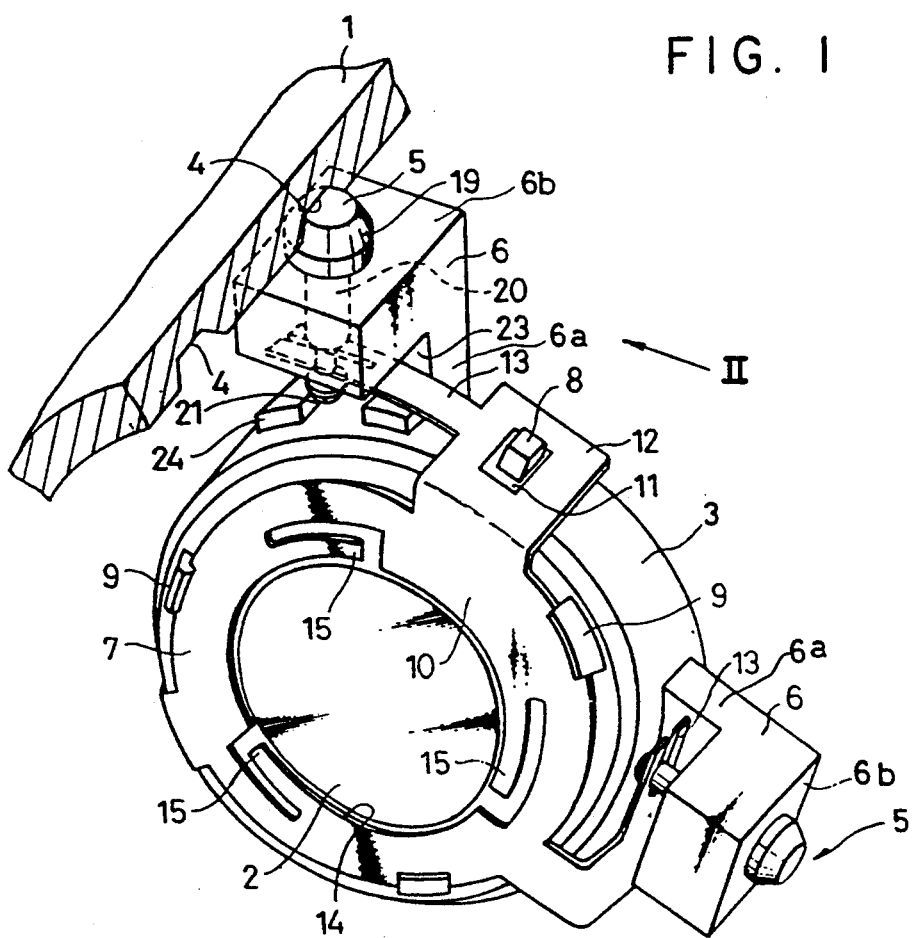
FIG. 1 is a perspective view of a cam mechanism according to an embodiment of the present invention.

A cam ring 1 to which a lens holder 3 holding a lens group 2 is attached is mounted to a lens barrel (not shown) so as to rotate about an optical axis. The cam ring 1 is provided on its inner periphery with spiral or helical cam grooves 4. The cam ring 1 is made of, for example, molded; and plastic. The cam grooves 4 have an outwardly widened trapezoid cross sectional shape, so that no undercut is produced by molding dies upon molding. The lens group 2 which usually consists of a plurality of lenses is represented by an outermost lens in FIG. 1.

The lens holder 3 has a cylindrical body which holds therein the lens group 2. The lens holder 3 is provided on its outer peripheral edge with three generally L-shaped holding members 6 which hold cam follower pins 5 and three small positioning projections 8 which hold lens retainer 7. The holding members 6 and the small projections 8 are circumferentially spaced from one another at an angular distance of 120°, respectively. The lens holder 3 has at its front face three claws 9 which are spaced from one another at an angular distance of 120° to secure a lens retainer 7, so that the lens retainer 7 is pressed against and secured to the lens holder 3 through the lens retainer 7.

Each of the holding members 6 has a supporting post 6a which extends in the radial direction of the lens holder 3 and a flange 6b which projects from the supporting post 6a in a direction parallel with the optical axis. The 6b have radially extending guide (insertion) holes 16 in which the associated cam follower pins 5 are fitted so as to move toward the cam groove 4. The lens holder 3 and the holding members 6 are integrally made of for example plastic.

The lens retainer 7 has a doughnut-shaped lens retaining body 10, three mounting members 12, each having a hole 11 in which the associated small projection 8 is engaged, and leaf spring portions 13 which bias the associated cam follower pins 5 projecting from the mounting members 12 along the circumference of the lens holder 3. The cam follower pins 5 are held and biased by the leaf spring portions 13. The retainer 7 is preferably made of plastic or a thin metal plate.

The outer diameter of the lens retaining body 10 is such that it can be held by the claws 9 which are located on an imaginary circle. The center opening 14 of the lens retaining body 10 comes into contact with the peripheral edge of the lens group 2. The retaining body 10 is provided on its periphery with three retaining spring portions 15 located on the peripheral edge of the opening 14. Each of the retaining spring portions 15 has a bent front end, so that it has an elasticity. Due to the elasticity, the lens group 2 which is mounted to the lens holder 3 is pressed at the outer peripheral edge thereof against the lens holder 3, so that the lens group 2 is firmly and immovably held on the lens holder 3.

Figure 3:
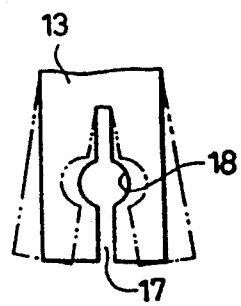
FIG. 3 is a plan view of a spring member which is deformed upon attachment of a cam follower; and, FIGS. 4A, 4B, 4C and 4D are sectional views for showing the connecting processes of the cam follower pin to a leaf spring, according to the present invention.

The leaf spring portions 13 projecting from the mounting members 12 biases the associated cam follower pins 5 and have slits or grooves 17 at the front ends thereof, as shown in FIG. 3. The slits 17 have small holes 18 located directly below the cam follower pin insertion holes 16 of the holding members 6.

Each cam follower pin 5 has a roller portion 19, a shaft portion 20 which rotatably supports the roller portion 19 and which is inserted in the associated insertion hole 16 of the holding member 6, a neck portion (peripheral groove) 22 formed at the rear end of the shaft portion 20, and a truncated conical rear end 21 formed at the rear end of the neck portion 22. The roller portions 19 can be integral with the shaft portions 20.

The roller portions 19 are in the shape of truncated cones corresponding to the sectional shape of the spiral cam groove 4. The roller portions 19 have lower cylindrical portions which are fitted in the associated recesses 33 formed on the top surfaces of the holding members 6.

The shaft portions 20 have a diameter which is larger than that of the small holes 18 of the leaf spring portions 13 and which is smaller than that of the lower cylindrical ends of the roller portions 19. The shaft portions 20 have an axial length so that when the cam follower pins 5 are inserted in the insertion holes 16 of the holding members 6, the lower ends of the shaft portions 20 slightly projects outward from the lower ends of the insertion holes 16 to come into contact with the circumferential edge of the small holes 18 of the leaf spring portions 13 thereby to slightly and downwardly push the leaf spring portions 13 of the mounting members 12.

The front (lower) ends 21 of the cam follower pins 5 are in the shape of a double truncated cone having opposed truncated cones, as shown in FIGS. 2, 4A through 4D. The largest diameter of the front ends 21 of the cam follower pins 5 is larger than that of the small holes 18 of the slits 17 of the leaf spring portions 13 and is such that the lower ends 21 can be inserted in the insertion holes 16. The diameter of the neck portions 22 of the cam follower pins 5 is substantially equal to or slightly smaller than the diameter of the small holes 18.

The lens holder 3 is slidably supported along and on a guide rod (not shown) provided in the lens barrel and extending in parallel with the optical axis to move in the optical axis direction without rotating about the optical axis.

The above mentioned various components (the lens holder 3, the lens group 2, the lens retainer 7, the cam follower pins 5, and the cam ring 1 etc.) according to the present invention are assembled as follows (see FIGS. 4A through 4D).

An operator inserts the lens group 2 into the lens holder 3 from the front face thereof, engages the lens retainer 7 in the claws 9 provided on the front face of the lens holder 3 to secure the lens group 2 to the lens holder 3, and engages the small projections 8 of the lens holder 3 in the holes 11 of the mounting members 12. In this state, the lens retaining spring portions 15 of the lens retaining body 10 of the lens retainer 7 come into contact with the surface of the lens group 2 to press the lens group 2 against the lens holder 3. The lens group 2 is retained and secured to the lens holder by the lens retainer 7. The leaf spring portions 13 are located in gaps 23 defined between the flanges 6b and the lens holder 3.

Figure 4A:
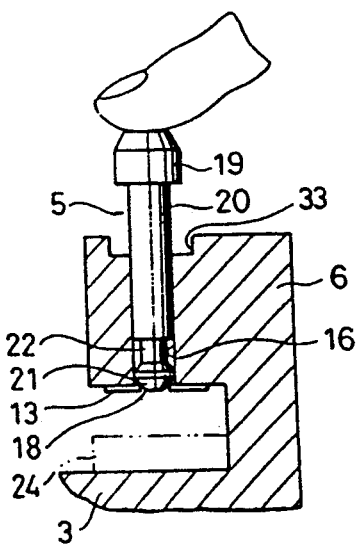
Figure 4B:
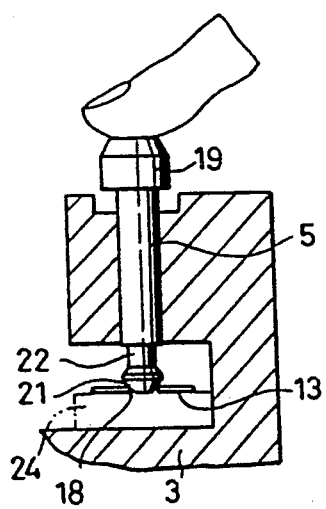

Thereafter, spring keepers 24 are located between the leaf spring portions 13 and the lens holder 3 to prevent the leaf spring portions 13 from being deflected from a predetermined position thereof toward the lens holder 3. Thereafter, the cam follower pins 5 are inserted in the insertion holes 16 from the front ends 21 thereof, so that the front terminal ends of the front ends 21 are brought into contact with the peripheral edges of the small holes 18 of the slits 17, as shown in FIG. 4A.

The spring keepers 24 come into contact with the leaf spring portions 13 to prevent the latter from being deflected as mentioned above and do not come into contact with the front ends 21 of the cam follower pins 5 to permit the latter to move in the radial directions. To this end, the spring keepers 24 are preferably of generally U-shape, so that no material of the spring keepers 24 exists immediately below the insertion holes 16, as can be seen in FIG. 1. It is also possible to form the spring keepers 24 integrally with the lens holder 3. In such an integral formation, it is necessary to provide a space (margin) which allows the cam follower pins 5 to move in the radial directions without coming into contact with the leaf spring portions 13 in an initial position in which the cam follower pins 5 are mounted.

After that, an operator pushes the roller portions 19 of the cam follower pins 5 toward the insertion holes with his or her finger or fingers. As a result, the small holes 18 (i.e. the leaf spring portions 13) are pushed down by the front ends 21 of the cam follower pins 5 until the leaf spring portions 13 come into contact with the upper surfaces of the spring keepers 24, so that the further downward elastic deformation (deflection) of the leaf spring portions 13 is prevented by the spring keepers 24.

Figure 4C:
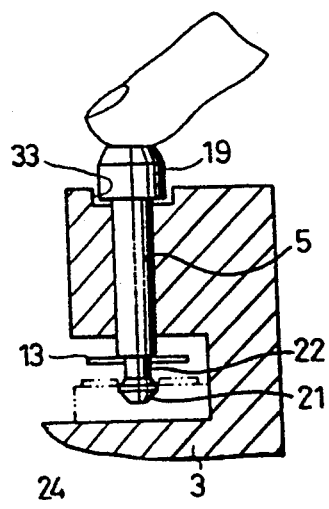

A further downward movement of the cam follower pins 5 causes the front ends 21 thereof to be inserted in the small holes 18 while widening the peripheral edges of the small holes 18 of the slits 17. When the front ends 21 pass through the associated small holes 18 until the neck portions 22 of the cam follower pins 5 enter the small holes 18, the slits 17 and the small holes 18 thereof are elastically returned to their original position due to the elastic restoring force thereof to firmly hold the associated cam follower pins 5, as shown in FIG. 4C.

Figure 4D:
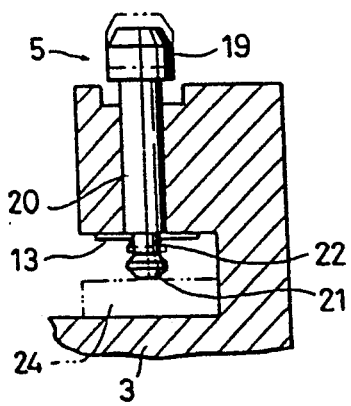

When the neck portions 22 of the cam follower pins 5 are fitted in the small holes 18, the operator releases the finger(s) from the roller portions 19. Consequently, the cam follower pins 5 are engaged and held by the leaf spring portions 13 which come into contact with the lower ends of the shaft portions 20 to bias the roller portions 19 in a direction to project outward therefrom (FIG. 4D).

Figure 2:
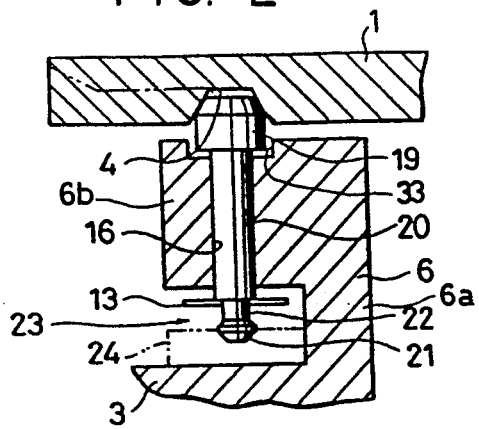
FIG. 2 is an enlarged sectional view of a cam mechanism shown in FIG. 1, viewed from the direction of an arrow II in FIG. 1.

In this state, since the cam follower pins 5 are prevented from coming out of the lens holder 3, the operator removes the spring keepers 24 and then inserts the lens holder 3 in the cam ring 1. When the roller portions 19 are fitted in the cam groove 4 of the cam ring 1, the cam follower pins 5 are slightly forced in the insertion holes 16 against the biasing force of the leaf spring portions 13, so that the roller portions 19 are biased to thrust into the cam groove 4 by the leaf spring portions 13. Thus, the roller portions 19 are pressed onto and firmly held by the conical side face of the cam groove 4 (FIG. 2).

As can be understood from the above discussion, according to the present invention, the cam follower pins 5 are elastically held in the cam groove 4 in such a way that the neck portions 22 of the cam follower pins 5 are fitted in and held by the slits 17 (small holes 18) of the leaf spring portions 13, thus resulting in a easy attachment of the cam follower pins 5.

Furthermore, according to the present invention, since the leaf spring portions 13 are formed on the lens retainer 7 which is mounted to the lens holder 3 to secure the lens group 2, the prevention of the cam follower pins 5 from coming out of the cam groove 4 and the holding of the lens group can be effected by the single member, thus resulting in a decreased number of components and an easy and inexpensive assembly.

Although the above discussion has been directed to one of the two lens groups for performing the zooming operation, it can be equally applied to the other lens group.

Furthermore, although the illustrated embodiment is directed to a zooming mechanism of a zoom lens, the cam mechanism of the present invention can be similarly applied to a focus adjusting mechanism, a light shield member moving mechanism and other cam mechanism.

As can be seen from the foregoing, according to the present invention, since the cam follower pins are provided with the engaging members which are engaged and held by the associated engaging portions of the spring members mounted to the lens holder to fit the cam follower pins in the cam groove of the cam ring, the retaining of the cam follower pins, i.e. the prevention of the cam follower pins from the cam groove and the biasing of the cam follower pins with an appropriate spring force can be easily realized, thus resulting in an easy assembly without paying attention to the disengagement of the cam follower pins from the cam groove. This makes it possible to automatically assemble the cam mechanism of the invention.

I claim:

1. A cam mechanism of a lens having a cam groove having a conical side face, formed in an inner peripheral surface of a cam ring, and a cam follower which is provided on a holder and which is fitted in said cam groove, so that said cam follower can be moved in an optical axis direction by the movement of said cam ring, comprising:

spring means provided on said holder to elastically support said cam follower in the radial direction of said cam ring; and mounting means provided on said spring means for engaging with said cam follower in said radial direction;

wherein said spring means comprises a leaf spring.

2. A cam mechanism according to claim 1, wherein said holder holds a lens group.

3. A cam mechanism according to claim 2, wherein said cam follower comprises a plurality of cam follower pins, each having a truncated conical portion corresponding to said conical cam groove.

4. A cam mechanism according to claim 3, wherein said holder comprises a cylindrical lens holding portion which holds a lens group and which has holding members integral therewith for holding said cam follower pins.

5. A cam mechanism according to claim 3, wherein each of said cam follower pins has a shaft portion which is provided on its front end with said truncated conical portion and on its rear end with a neck portion and a tapered terminal end connected to said neck portion.

6. A cam mechanism according to claim 5, wherein said truncated conical portions of said cam follower pins are in the form of rollers which are rotatably supported by said shaft portions.

7. A cam mechanism according to claim 6, wherein said holder comprises guide portions which movably guide the cam follower pins in said radial direction.

8. A cam mechanism according to claim 7, wherein each of said guide portions comprises a supporting post which extends in the radial direction from the lens holder integral therewith, a flange portion which projects from the front end of the supporting post in a direction parallel with the optical axis, and an insertion hole which is formed in the flange portion, so that the shaft portions of the associated cam follower pins are inserted in the insertion holes to movably guide the cam follower pins in the radial directions through the shaft portions of the cam follower pins.

9. A cam mechanism according to claim 8, wherein said guide portions are circumferentially spaced from one another at a predetermined angular distance.

10. A cam mechanism according to claim 8, further comprising a lens retainer which is mounted to said lens holder to secure said lens group and which has a spring means for engaging with the rear ends of said cam follower pins which are inserted in said insertion holes to elastically bias the same toward said cam groove.

11. A cam mechanism according to claim 10, wherein said spring means comprises leaf spring members which extend in a direction across the optical axis and have at their front ends engaging portions which engage with said cam follower pins.

12. A cam mechanism according to claim 11, wherein said cam follower pins have at their rear ends neck portions which project outward from the associated insertion holes.

13. A cam mechanism according to claim 12, wherein said leaf spring members have slits in which the neck portions of the associated cam follower pins are fitted and 14. A cam mechanism according to claim 13, wherein said cam follower pins have front ends which widen the slits of said leaf spring members when said cam follower pins are inserted in the associated insertion holes to a predetermined depth.

15. A cam mechanism according to claim 14, wherein said lens holder has spring keepers which are opposed to the insertion holes so as not to come into contact with the front ends of the cam follower pins and so as to come into contact with the leaf spring members when the neck portions of the cam follower pins are fitted in the slits.

16. A cam mechanism according to claim 1, wherein said cam follower comprises a cam follower pin, having a truncated conical portion corresponding to said conical cam groove.

17. The cam mechanism of claim 1 wherein said mounting means limits outward axial movement of said cam follower along said radial direction.

18. A cam mechanism of a lens having a cam groove having a conical side face, formed in an inner peripheral surface of a cam ring, and a cam follower which is provided on a holder and which is fitted in said cam groove, so that said cam follower can be moved in an optical axis direction by the movement of said cam ring, comprising:

spring means provided on said holder to elastically support said cam follower in the radial direction of said cam ring; and mounting means provided on said spring means for engaging with said cam follower;

wherein said spring means comprises a leaf spring.

19. A cam mechanism according to claim 18, wherein said holder holds a lens group.

20. A cam mechanism according to claim 18, wherein said cam follower is engaged in said spring means from a radial direction.

21. A cam mechanism according to claim 18, wherein said cam follower comprises a plurality of cam follower pins, each having at its rear end an engaging portion.

22. A cam mechanism according to claim 21, wherein said spring means comprises engaging portions which are engaged by the associated engaging portions of the cam follower pins.

23. A cam mechanism according to claim 22, wherein said cam follower pins have at their rear ends neck portions which define the engaging portions thereof.

24. A cam mechanism according to claim 21, wherein said spring means comprises leaf spring members having slits and holes in which the neck portions of said cam follower pins are held.

25. A cam mechanism according to claim 24, wherein said lens holder comprises a cylindrical body for holding the lens group and a lens retainer which is mounted to the lens holding cylindrical body to secure the lens group thereto.

26. A cam mechanism according to claim 25, wherein said leaf spring members are integrally formed with said lens retainer.

27. The cam mechanism of claim 18 wherein said mounting means limits outward axial movement of said cam follower along said radial direction.

28. A cam mechanism of a lens having a cam groove having a conical side face, formed in an inner peripheral surface of a cam ring, and a cam follower which is provided on a holder and which is fitted in said cam groove, so that said cam follower can be moved in an optical axis direction by the movement of said cam ring, comprising:

spring means provided on said holder to elastically support said cam follower in the radial direction of said cam ring; and mounting means provided on said spring means for engaging with said cam follower;

wherein said cam follower comprises a plurality of cam follower pins, each having at its rear end an engaging portion, and said spring means comprises engaging portions which are engaged by the associated engaging portions of said cam follower pins.

* * * * *

UNITED STATES PATENT AND TRADEMARK OFFICE
CERTIFICATE OF CORRECTION

PATENT NO. : 5,210,644
DATED : May 11, 1993
INVENTOR(S) : H. NOMURA

It is certified that error appears in the above-indentified patent and that said Letters Patent is hereby corrected as shown below:

At column 6, line 52 (claim 7, line 3), change "the" to ---said---.
At column 7, line 17 (claim 13, line 4), after "and" insert ---engaged---.

Signed and Sealed this

Fourteenth Day of November, 1995

Attest:

BRUCE LEHMAN

Attesting Officer

Commissioner of Patents and Trademarks